United States Patent [19]
Kar

[11] Patent Number: 4,877,306
[45] Date of Patent: Oct. 31, 1989

[54] COATED OPTICAL WAVEGUIDE FIBERS

[75] Inventor: Gitimoy Kar, Painted Post, N.Y.

[73] Assignee: Corning Glass Works, Corning, N.Y.

[21] Appl. No.: 103,032

[22] Filed: Sep. 30, 1987

[51] Int. Cl.$^4$ .............................................. G02B 6/22
[52] U.S. Cl. .............................. 350/96.33; 350/96.30; 427/163
[58] Field of Search ............... 350/96.29, 96.30, 96.31, 350/96.32, 96.33, 96.34; 65/3.11, 3.12; 427/163

[56] References Cited

U.S. PATENT DOCUMENTS

| 4,113,349 | 9/1978 | Stiles | 350/96.33 X |
| 4,184,860 | 1/1980 | Schneider | 65/3 |
| 4,243,298 | 1/1981 | Kao | 350/96.33 |
| 4,306,767 | 12/1981 | Kawachi et al. | 350/96.33 |
| 4,385,802 | 5/1983 | Blaszyk et al. | 350/96.33 |
| 4,690,502 | 9/1987 | Zimmerman et al. | 350/96.33 X |

FOREIGN PATENT DOCUMENTS 223466  5/1987  European Pat. Off. .

OTHER PUBLICATIONS

Carson et al., *Journal of Non-Crystalline Solids*, 11:368-380, 1973.
Mauer, R. D., *Proceedings of the IEEE*, 61: 452-462, 1973.

Primary Examiner—John D. Lee
Assistant Examiner—Phan T. Heartney
Attorney, Agent, or Firm—Walter S. Zebrowski

[57] ABSTRACT

An optical waveguide fiber is provided which comprises (a) a glass core; (b) a glass cladding which includes a barrier layer in the region of its outer surface which has an index of refraction and an absorption coefficient which are greater than the index of refraction and the absorption coefficient of the remainder of the cladding; and (c) a polymeric protective coating which is in direct contact with the outer surface of the cladding and which has an index of refraction which is less than the index of refraction of the barrier layer and less than the index of refraction of the remainder of the cladding. In certain preferred embodiments, the polymeric coating is selected from the group consisting of RTV silicone rubbers, UV curable silicones of the thioene type, UV curable silicone acrylates, and fluoropolymeric coatings.

17 Claims, 3 Drawing Sheets

COATED OPTICAL WAVEGUIDE FIBERS

BACKGROUND OF THE INVENTION

1. Field of the Invention

This invention relates to coated optical waveguide fibers and, in particular, to coated optical waveguide fibers wherein the coating's index of refraction is lower than that of the fiber's cladding.

2. Description of the Prior Art

Conventional optical waveguide fibers comprise a central glass core which is surrounded by a glass cladding. To protect the core and cladding, one or more layers of a polymeric material, such as, a UV-curable acrylate resin, are applied to the cladding.

To function as a waveguide, the index of refraction of the core must be higher than the index of refraction of the cladding. Typically, the cladding is made of essentially pure silica having an index of refraction ($n_D$) of approximately 1.458, and the core is a doped silica having a slightly higher index of refraction, e.g., 1.462 for a typical single mode fiber.

Although an optical waveguide fiber will function with a protective coating whose index of refraction is lower than the index of refraction of the cladding, a protective coating having a higher index of refraction is generally preferred in order to eliminate the problems which can be caused by the propagation of energy in the cladding rather than in the core, i.e., to eliminate the problems caused by cladding modes.

Specifically, among other problems, cladding modes can cause bandwidth problems in fibers of short length and modal interference and amplitude (power) fluctuation problems when a fiber is used as a pigtail or jumper cable. In addition, cladding modes make the measurement of fiber properties, in particular, attenuation, more difficult and potentially inaccurate. Specifically, since fiber attenuation is normally determined by comparing the amount of light transmitted through the full length of a fiber with the amount of light transmitted through the first two meters of the fiber, a higher attenuation, which does not correspond to the true properties of the fiber, will be calculated if cladding modes are able to propagate through the first two meters of the fiber.

To deal with the cladding mode problem in measuring attenuation, existing techniques have employed complicated mechanisms for stripping cladding modes from fibers. For example, glycerine mode strippers have been placed at the launch and detection ends of the two meter fiber.

More generally, the cladding mode problem has been dealt with by using protective coatings whose indices of refraction are above that of the fiber's cladding. For example, fibers have been coated with a low modulus primary buffer having an index of refraction greater than 1.46 and with one or two layers on top of the primary buffer of higher modulus secondary buffers which provide strength and abrasion resistance. Alternatively, a single coating having an index of refraction greater than 1.46 has been used. In both cases, since the index of refraction of the coating in contact with the cladding is greater than the index of refraction of the cladding, total internal reflection of light at the cladding-to-coating interface will not occur. Accordingly, cladding modes are rapidly stripped out of the optical-quality cladding into the non-optical-quality coating where they are absorbed.

Unfortunately, reasonably-priced coatings which have a high index of refraction are in general lacking in other properties, such as, elastic modulus, coefficient of thermal expansion, moisture sensitivity, mechanical strength, and thermal stability. Looked at another way, the most desirable materials for use as coatings, i.e., materials which have one or more of the foregoing properties, typically have indices of refraction below that of silica.

For example, many silicone rubbers, such as, RTV (room-temperature vulcanizing) silicone rubbers, have a low elastic modulus over a wide temperature range, a low moisture sensitivity, and a high thermal stability up to 200° C. Accordingly, these materials would make excellent coatings for optical waveguide fibers. Unfortunately, RTV silicone rubbers have a refractive index of approximately 1.42, well below the index of refraction of silica, and thus will not strip cladding modes from conventional single mode or multi-mode fibers.

In an attempt to overcome this problem, some manufacturers of optical waveguide fibers have applied a coating of a specially formulated silicone rubber, having an index of refraction of approximately 1.5, to the fiber's cladding, and have then coated this coating with a standard RTV silicone rubber. To try to offset the high cost of the high index silicone rubber, extremely thin coatings, e.g., on the order of 10 to 15 microns, have been used. Obviously, this approach makes the coating process more expensive, complex, and difficult to control.

Optical waveguide fibers having glass claddings which include an outer layer having a coefficient of expansion which is greater than that of the rest of the cladding have been proposed. See Kao et al., U.S. Pat. No. 4,243,298, and Schneider et al., U.S. Pat. No. 4,184,860. The Schneider et al. patent further states that the outer layer can be selected to have an index of refraction which is greater than the remainder of the cladding. Neither of these references, however, disclose or suggest using a high index of refraction layer so as to be able to directly coat the cladding of an optical waveguide fiber with a low index of refraction, high performance polymeric coating.

SUMMARY OF THE INVENTION

In view of the foregoing state of the art, it is an object of the present invention to provide improved coated optical waveguide fibers. More particularly, it is an object of the invention to provided coated optical waveguide fibers wherein: (1) the coating is applied directly to the fiber's cladding, (2) the coating is a high performance polymeric coating having an index of refraction which is less than the index of refraction of the fiber's cladding, and (3) notwithstanding the lower index of refraction of the coating, cladding modes will only propagate short distances down the fiber, e.g., distances on the order of less than a few tenths of a meter.

It is an additional object of the invention to provide optical waveguide fibers which have been directly coated with a standard room-temperature curing silicone rubber, having a low index of refraction, without the need for an intermediate layer of a high index of refraction silicone rubber.

It is also an object of the invention to provide coated optical waveguide fibers whose attenuation characteristics can be readily determined without the need for specialized equipment to strip cladding modes from the fiber.

In accordance with the invention, the foregoing and other objects are achieved by means of an optical waveguide fiber which comprises a glass core, a glass cladding, and a low index of refraction, polymeric coating which is applied directly to the outside surface of the cladding.

The cladding includes a "barrier" layer in the region of its outer surface which has an index of refraction and an absorption coefficient which are greater than the index of refraction and the absorption coefficient of the remainder of cladding. The low index of refraction coating has an index of refraction which is lower than that of the barrier layer and also lower than that of the remainder of the cladding. Because the index of refraction of the barrier layer is greater than that of the remainder of the cladding, total internal reflection does not occur at the interface between the barrier layer and the rest of the cladding. Rather, light which is propagating in the cladding passes into the barrier layer where it is absorbed due to the higher absorption coefficient of this layer. In this way, cladding modes are rapidly stripped from the fiber, notwithstanding the fact that the fiber's coating has an index of refraction which is less than that of the cladding.

In certain preferred embodiments, the barrier layer is located at the outer surface of the cladding and has a thickness of between about 2 and about 3 microns. In other preferred embodiments, the barrier layer is formed by doping a silica glass with a material selected from the group consisting of FeO, CdO, $MoO_3$, $Cr_2O_3$, $V_2O_5$, CoO, $Nb_2O_5$, and $TiO_2$. Titanium dioxide is a particularly preferred dopant. When this material is used, it is further preferred to enrich the concentration of titanium in its reduced, $Ti^{3+}$, form by drawing the fiber under as high a temperature as reasonably practical.

By means of the invention, a variety of low index of refraction materials can be used to coat optical waveguide fibers. In particular, low cost, high performance, RTV silicone rubbers can be applied directly to the fiber's cladding without first applying a high index refraction coating as was done in the prior art.

The accompanying drawings, which are incorporated in and constitute part of the specification, illustrate the preferred embodiments of the invention, and together with the description, serve to explain the principles of the invention.

DESCRIPTION OF THE PREFERRED EMBODIMENTS

Figure 1:
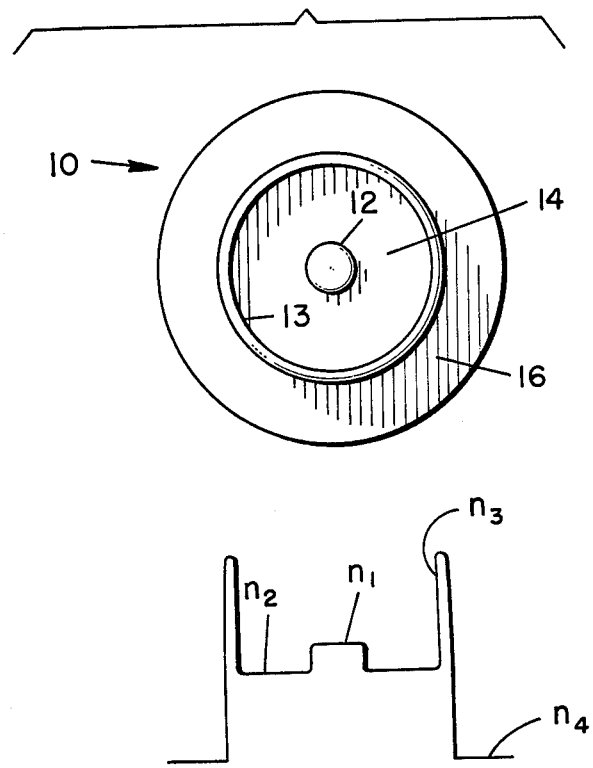
FIG. 1 is a schematic illustration of the structure and indices of refraction of an optical waveguide fiber prepared in accordance with the present invention.

With reference to FIG. 1, optical waveguide fiber 10 of the present invention comprises core 12 having index of refraction $n_1$, cladding 14 having index of refraction $n_2$, and polymeric coating 16 having index of refraction $n_4$ which is less than the index of refraction of the cladding. The fiber can be either a single mode or multimode fiber.

At or near the outside surface of the fiber's cladding is barrier layer 13 which has an index of refraction ($n_3$) and an absorption coefficient which are greater than the index of refraction and the absorption coefficient of the remainder of the cladding. The barrier layer strips cladding modes from the fiber which would otherwise propagate down the fiber due to total internal reflection at the interface between cladding 14 and coating 16.

The fibers of the invention can be produced by a variety of techniques now known or subsequently developed in the art. Vapor deposition techniques are particularly preferred. Examples of these techniques include the outside vapor deposition process (OVD process), the vapor axial deposition process (VAD process), the modified chemical vapor deposition process (MCVD process) and the plasma chemical vapor deposition process (PCVD process). A discussion of these techniques for producing optical waveguide fibers can be found in *Optical Fiber Communications*, Vol. 1, edited by Tingye Li, Academic Press, New York, N.Y., 1985, the pertinent portions of which are incorporated herein by reference.

In accordance with the vapor deposition techniques, multi-step processes are used to form a glass body from vapors of silicon dioxide and suitable dopants. The glass body is then heated and drawn into the desired optical waveguide fiber. The dopants serve to either increase or decrease the index of refraction of the silicon dioxide and thus produce the core and cladding of the finished fiber. For example, the index of refraction of the core can be increased relative to the cladding by doping the portion of the glass body corresponding to the core with, for example, germanium. Alternatively, the index of refraction of the cladding can be decreased relative to the core by doping the portion of the glass body corresponding to the cladding with, for example, fluorine.

To produce barrier layer 13, the portion of the glass body corresponding to the outer 2-3 microns of the cladding of the finished fiber is doped with one or more materials which increase the cladding's index of refraction and absorption coefficient at the wavelength(s) at which the fiber is to be used, e.g., in the infrared region. For the OVD and VAD processes, the additional dopant(s) can be added as the outer portion of the porous preform, formed in these processes, is being deposited. For the MCVD and PCVD processes, vapor deposition can be used to add the additional dopant(s) to the outside of the silica tube used in these processes. Alternatively, vapor deposition can be used to form the barrier layer directly on the finished fiber immediately following drawing, i.e., between drawing and coating.

The additional dopant(s) must produce both an increase in index of refraction and an increase in absorption coefficient. The index of refraction increase is needed so that total internal reflection will not occur at the interface between the barrier layer and the remainder of the fiber's cladding, i.e., so that cladding modes will enter the barrier layer.

Total internal reflection will occur at the outer edge of the barrier layer since at that edge light is passing from a higher index of refraction region (the barrier layer) to a lower index of refraction region (the polymeric coating if the barrier layer is at the outer edge of the cladding, or the body of the cladding if the barrier layer is inside the outer edge of the cladding). If the barrier layer's absorption coefficient was low, e.g., on the order of the absorption coefficient of the cladding, this reflected light would re-enter the body of the cladding and propagate down the fiber as cladding modes. It is for this reason that the dopant(s) used for the barrier layer must increase the absorption coefficient of the cladding material in addition to increasing its index of refraction.

Various materials can be used as the dopant(s) for the barrier layer. Examples of suitable materials include FeO, CdO, MoO$_3$, Cr$_2$O$_3$, V$_2$O$_5$, CoO, Nb$_2$O$_5$, and TiO$_2$. TiO$_2$ is particularly preferred. See Carson, D. S., and Maurer, R. D., "Optical Attenuation in Titania-Silica Glasses," *Journal of Non-Crystalline Solids*, 11:368–380 (1973): Mauer, R. D., "Glass Fibers for Optical Communications," *Proceedings of the IEEE*, 61:452–462 (1973).

In using these and other dopants, it is important to control the oxidation state of the dopant in the finished fiber so as to achieve the desired increase in absorption coefficient. For example, in the case of TiO$_2$, the barrier layer should include an enriched concentration of titanium in its reduced form, i.e., in its Ti$^{3+}$ form. This increased concentration can be achieved by drawing the fiber under reducing conditions at as high a temperature as practical.

The optical waveguide fibers of the invention can be coated with a variety of low index of refraction materials. As discussed above, through the use of the barrier layer, the flexibility in choosing coatings is greatly increased. Examples of coatings which can be directly applied to the fiber's cladding include RTV silicone rubbers, UV curable silicones of the "thioene" type, UV curable silicone acrylates, fluoropolymeric coatings, and the like. The coatings are applied to the fiber using conventional techniques, e.g., by passing the fiber through one or more coaters immediately after it has been drawn.

Without intending to limit it in any manner, the invention will be more fully described by the following example.

EXAMPLE

Single mode optical waveguide fibers with and without a barrier layer were prepared using the OVD process. The fibers had a germanium doped core ($n_D = 1.462$; $r =$ approximately 5 microns) and a silica cladding ($n_D = 1.458$; $r = 62.5$ microns).

The barrier layer was formed during the OVD laydown process by doping the outer portion of the preform for the fiber with TiO$_2$. TiO$_2$ concentrations in the range of 6½ to 12 percent were tested and a concentration of approximately 8 percent was found to be preferred. The thickness of the TiO$_2$ layer in the finished fiber was between about 2 and 3 microns, and the layer was located at the outer edge of the cladding.

Figure 2A:
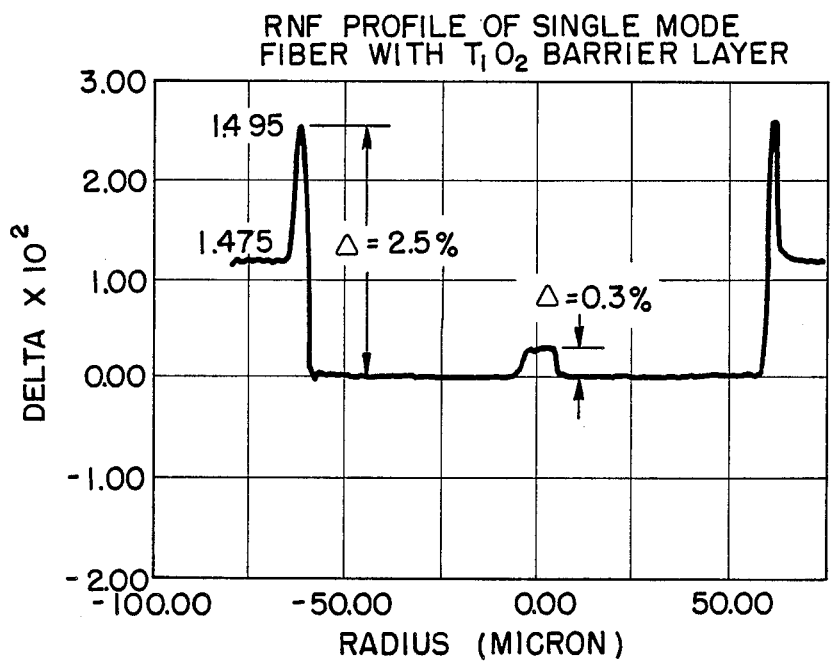
FIGS. 2A and 2B show the refracted near field profiles of a fiber with (panel A) and without (panel B) a high index of refraction barrier layer.
Figure 2B:
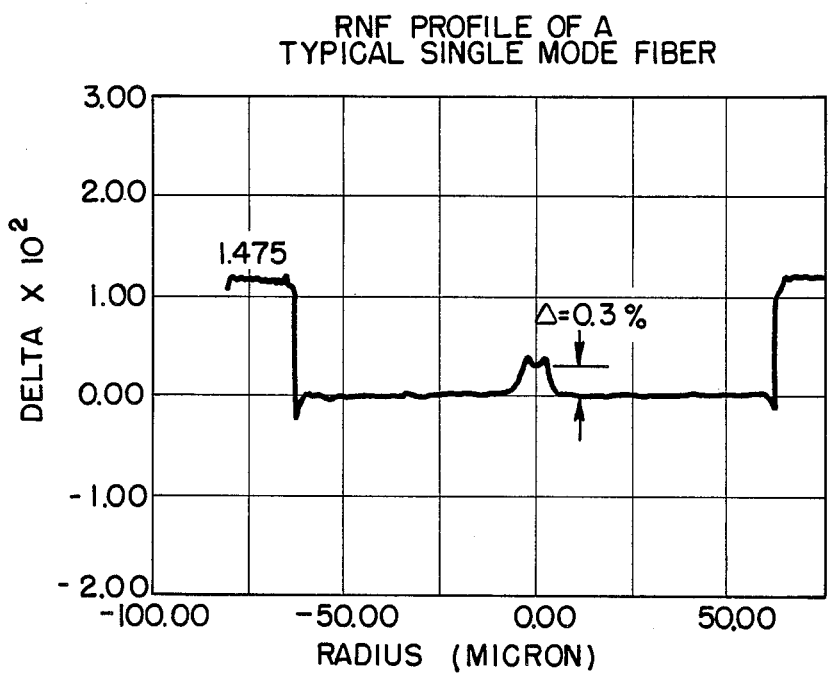

The refractive index profile of fibers with and without a barrier layer was measured using the refracted near field technique. The tests were performed on uncoated fibers surrounded with an index of refraction matching fluid having an index of refraction of 1.473. The results of these measurements are shown in FIGS. 2A (barrier layer) and 2B (no barrier layer). As shown therein, the barrier layer was located at the outer edge of the cladding, had a peak index of refraction of approximately 1.495, and a thickness of approximately 2.5 microns.

Fibers including a barrier layer were coated with the following low index of refraction coatings:

| | |
|---|---|
| Dow Corning (X3-6610) | $n_D = 1.421$ |
| Shin Etsu (OT-163) | $n_D = 1.420$ |
| DeSoto (R-1400) | $n_D = 1.440$ |

Fibers not including a barrier layer were coated with the Dow Corning material and with a high index of refraction coating, namely, a urethane acrylate coating having an index of refraction of $n_D = 1.52$.

The coatings were applied directly to the outer surface of the cladding using a conventional coater. The Dow Corning and Shin Etsu coatings are UV curable resins which employ a "thio-ene" curing mechanism. The DeSoto coating is a UV curable silicone acrylate resin. The Dow Corning coating is manufactured by Dow Corning Corporation, Midland, Mich.; the Shin Etsu coating is manufactured by Shin Etsu Chemicals Company, Isobe, Japan; and the DeSoto coating is manufactured by DeSoto, Inc., Des Plaines, Ill.

The ability of the barrier layer to strip cladding modes was tested by measuring the transmitted near field profiles of barrier-containing fibers coated with the Dow Corning and Shin Etsu materials. The measurement was carried out at 1300 nm, using an overfilled launch condition. The glycerine mode strippers normally used for this measurement were removed from the launch and detection ends. Fibers having a length of 2 meters were used, and the fibers were arranged so as not to have a bend radius smaller than 125 millimeters to ensure that no outside forces were stripping any light from the cladding.

Figure 3A:
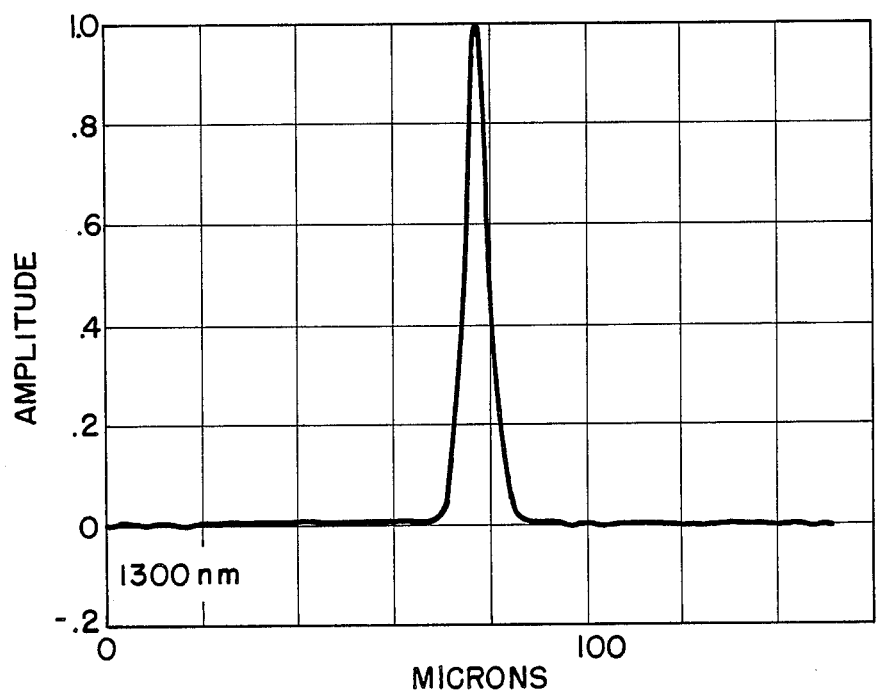
FIGS. 3A and 3B show transmitted near field profiles for two fibers having a high index of refraction barrier layer and a low index of refraction coating.
Figure 3B:
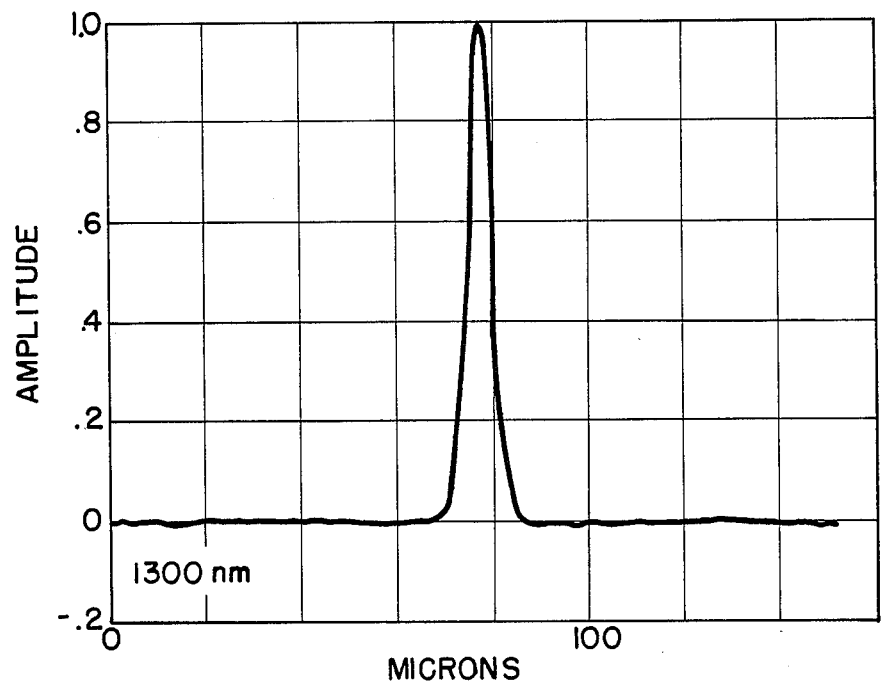

The results of these tests are shown in FIG. 3, where FIG. 3A shows the results with the Dow Corning material and FIG. 3B shows the results with the Shin-Etsu material. As shown in these figures, essentially no power is being carried in the claddings of these fibers.

Attenuation measurements were performed on (1) fibers without a barrier layer coated with a high index of refraction coating ($n_D = 1.52$), (2) fibers without a barrier layer coated with the Dow Corning material, and (3) fibers having a TiO$_2$ barrier layer and coated with the Dow Corning, DeSoto, and Shin Etsu materials. The measurements were performed at 1300 nm and 1550 nm using the "cutback method." In accordance with this method, a narrow spectral band of light was launched into a full length of fiber, e.g., 1100 meters, and the transmitted intensity measured. The measurement was repeated using the first two meters of the same fiber without disturbing the input end of the fiber. The attenuation was then calculated by taking the negative logarithm of the ratio between the "long length" intensity and the "short length" intensity and normalized this value to 1,000 meters.

The results of these experiments are shown in Table 1. As shown therein, the fibers without a barrier layer showed an increase in attenuation when coated with a low index of refraction coating in comparison to their attenuation when coated with a high index of refraction coating. This increase is due to the fact that cladding modes are able to propagate down the first two meters of the fibers coated with the low index of refraction material. Accordingly, the short length intensity is greater than it would be if the cladding modes had been stripped. This increase in short length intensity, in turn, means that the long length/short length ratio is decreased, thus leading to the increase in observed attenuation.

The fibers with a barrier layer, on the other hand, showed essentially the same attenuation as that achieved by the non-barrier fibers with the high index of refraction coating. These results clearly show the ability of the barrier layer to strip cladding modes and thus permit the direct application of low index of refraction coatings to a fiber's cladding.

In addition to the foregoing, it was also observed that the fibers with the $TiO_2$-doped barrier layer had nearly one-third the break rate of fibers without the barrier layer, had a tighter Weibull distribution, and had a higher fatigue resistance, specifically, a stress corrosion susceptibility factor of 29 as compared to 22 for fibers without the barrier layer.

TABLE 1

| BARRIER LAYER | PRIMARY COATING | ATTENUATION 1300 nm | ATTENUATION 1550 nm |
|---|---|---|---|
| No | High Index | $0.35^a$ | $0.21^a$ |
| No | Dow Corning | $0.54^b$ | $0.30^c$ |
| Yes | Dow Corning | $0.36^d$ | $0.21^e$ |
| Yes | Dow Corning | $0.37^f$ | $0.21^g$ |
| Yes | DeSoto | $0.33^h$ | $0.21^i$ |
| Yes | DeSoto | $0.41^j$ | $0.25^k$ |
| Yes | DeSoto | 0.43 | 0.23 |
| Yes | Shin Etsu | $0.44^l$ | $0.28^m$ |

$^a \pm 10\% = \pm 2\sigma$
$^b$average of 0.45, 0.59, 0.75, 0.38
$^c$average of 0.28, 0.35, 0.36, 0.23
$^d$average of 0.36, 0.36
$^e$average of 0.21, 0.21
$^f$average of 0.34, 0.38, 0.34, 0.45
$^g$average of 0.20, 0.24, 0.19, 0.23
$^h$average of 0.32, 0.34
$^i$average of 0.21, 0.21
$^j$average of 0.45, 0.40, 0.39
$^k$average of 0.31, 0.23, 0.26
$^l$average of 0.43, 0.46
$^m$average of 0.26, 0.30

What is claimed is:

1. An optical waveguide fiber comprising:
   (a) a glass core:
   (b) a glass cladding which includes a layer in the region of its outer surface which has an index of refraction and an absorption coefficient which are greater than the index of refraction and the absorption coefficient of the remainder of the cladding; and
   (c) a polymeric protective coating which is in direct contact with the outer surface of the cladding and which has an index of refraction which is less than the index of refraction of the layer and less than the index of refraction of the remainder of the cladding.

2. The optical waveguide fiber of claim 1 wherein the layer is located at the outer surface of the cladding.

3. The optical waveguide fiber of claim 1 wherein the layer has a thickness of between about 2 and about 3 microns.

4. The optical waveguide fiber of claim 1 wherein the index of refraction of the layer is greater than 1.48 and the index of refraction of the remainder of the cladding is approximately 1.46.

5. The optical waveguide fiber of claim 1 wherein the layer comprises a silica glass which has been doped with a material selected from the group consisting of FeO, CdO, $MO_3$, $Cr_2O_3$ 2, $V_2O_5$, CoO, $Nb_2O_5$, and $TiO_2$.

6. The optical waveguide fiber of claim 5 wherein the dopant is $TiO_2$.

7. The optical waveguide fiber of claim 6 wherein the layer includes an enriched concentration of titanium in its reduced, $Ti^{3+}$, form.

8. The optical waveguide fiber of claim 1 wherein the polymeric protective coating is a silicone rubber.

9. The optical waveguide fiber of claim 1 wherein the polymeric protective coating is selected from the group consisting of RTV silicone rubbers, UV curable silicones of the thio-ene type, UV curable silicone acrylates, and fluoropolymeric coatings.

10. The optical waveguide fiber of claim 1 wherein the power carried by cladding modes decays to essentially zero in less than about 0.2 meters.

11. The optical waveguide fiber of claim 1 wherein the layer comprises a silica glass which has been doped with $TiO_2$, includes an enriched concentration of titanium in its reduced, $ti^{3+}$, form, has an index of refraction greater than 1.48, and is located at the outer surface of the cladding.

12. The optical waveguide fiber of claim 11 wherein the polymeric protective coating is selected from the group consisting of RTV silicone rubbers, UV curable silicones of the thio-ene type, UV curable silicone acrylates, and fluoropolymeric coatings.

13. A method for coating an optical waveguide fiber with a low index of refraction coating comprising the steps of:
   (a) providing an optical waveguide fiber which comprises:
      (i) a glass core, and
      (ii) a glass cladding which includes a layer in the region of its outer surface which has an index of refraction and an absorption coefficient which are greater than the index of refraction and the absorption coefficient of the remainder of the cladding; and
   (b) coating the outside surface of the cladding with the low index of refraction coating, said coating having an index of refraction which is less than that of the layer and less than that of the remainder of the cladding.

14. The method of claim 13 wherein the layer is formed by doping a silica glass with a material selected from the group consisting of FeO, CdO, $MoO_3$, $Cr_2O_3$, $V_2O_5$, CoO, $Nb_2O_5$, and $TiO_2$.

15. The method of claim 14 wherein the layer is doped with $TiO_2$.

16. The method of claim 13 wherein the low index of refraction coating is a silicone rubber.

17. The method of claim 13 wherein the low index of refraction coating is selected from the group consisting of RTV silicone rubbers, UV curable silicones of the thio-ene type, UV curable silicone acrylates, and fluoropolymeric coatings.

* * * * *